(12) United States Patent
Berkebile et al.

(10) Patent No.: US 10,022,654 B2
(45) Date of Patent: Jul. 17, 2018

(54) GAS-LIQUID DISTRIBUTION TECHNIQUE FOR WATER OR WASTEWATER FILTERS USING UNDERDRAINS

(71) Applicant: Xylem Water Solutions Zelienople LLC, Zelienople, PA (US)

(72) Inventors: Dean T. Berkebile, Cranberry Township, PA (US); Brian J. Bates, Cranberry Township, PA (US); Robert J. Green, Butler, PA (US)

(73) Assignee: XYLEM WATER SOLUTIONS ZELIENOPLE LLC, Zelienople, PA (US)

( * ) Notice: Subject to any disclaimer, the term of this patent is extended or adjusted under 35 U.S.C. 154(b) by 1096 days.

(21) Appl. No.: 14/107,843

(22) Filed: Dec. 16, 2013

(65) Prior Publication Data

US 2014/0166593 A1    Jun. 19, 2014

Related U.S. Application Data

(60) Provisional application No. 61/738,319, filed on Dec. 17, 2012.

(51) Int. Cl.
| | | |
|---|---|---|
| *B01D 24/24* | (2006.01) | |
| *B01D 24/46* | (2006.01) | |
| *B01D 24/16* | (2006.01) | |
| *B01D 24/26* | (2006.01) | |

(52) U.S. Cl.
CPC ......... *B01D 24/24* (2013.01); *B01D 24/4636* (2013.01); *B01D 24/16* (2013.01); *B01D 24/266* (2013.01)

(58) Field of Classification Search
CPC ...... B01D 24/266; B01D 24/16; B01D 24/24; B01D 24/4636
See application file for complete search history.

(56) References Cited

U.S. PATENT DOCUMENTS

| | | | | |
|---|---|---|---|---|
| 4,065,391 A | * | 12/1977 | Farabaugh | B01J 8/0278 210/274 |
| 4,331,542 A | | 5/1982 | Emrie | |
| 4,581,143 A | * | 4/1986 | Pepper, III | C02F 3/06 210/614 |
| 4,604,197 A | * | 8/1986 | Louboutin | B01D 24/266 210/150 |

(Continued)

*Primary Examiner* — Amber R Orlando
*Assistant Examiner* — Stephen Hobson
(74) *Attorney, Agent, or Firm* — The Webb Law Firm

(57) ABSTRACT

A method of distributing gas and liquid through an underdrain system includes: a) positioning an underdrain system on a filter floor, the underdrain system comprising at least one underdrain block and filter media positioned on top of the underdrain block; b) distributing gas sufficiently evenly through the underdrain system at a rate of less than 2 scfm/ft$^2$ by distributing a liquid at a rate of less than 2 gpm/ft$^2$ concurrently with the gas; c) increasing the distribution rate of the liquid, or increasing the distribution rate of the liquid and the distribution rate of the gas; d) stopping the distribution of gas; e) further increasing the distribution rate of the liquid; and f) decreasing the distribution rate of the liquid. A method of distributing gas and liquid during an upflow filtration mode is also included.

14 Claims, 3 Drawing Sheets

(56) References Cited

U.S. PATENT DOCUMENTS

| | | | |
|---|---|---|---|
| 4,659,462 A * | 4/1987 | Chapman | C02F 1/283 210/202 |
| 4,707,257 A | 11/1987 | Davis et al. | |
| 4,995,990 A | 2/1991 | Weston | |
| 5,019,259 A | 5/1991 | Hambley | |
| 5,108,627 A | 4/1992 | Berkebile et al. | |
| 5,156,738 A * | 10/1992 | Maxson | B01D 24/22 210/274 |
| 5,160,613 A | 11/1992 | Walter | |
| 5,176,827 A | 1/1993 | Walter | |
| 5,296,138 A | 3/1994 | Walter | |
| 5,413,710 A | 5/1995 | Roberts et al. | |
| 5,489,388 A | 2/1996 | Brown et al. | |
| 5,639,384 A | 6/1997 | Brown et al. | |
| 6,143,188 A | 11/2000 | Jantsch, Sr. et al. | |
| 6,312,611 B1 | 11/2001 | Bergman et al. | |
| 6,740,237 B1 | 5/2004 | Roberts et al. | |

\* cited by examiner

GAS-LIQUID DISTRIBUTION TECHNIQUE FOR WATER OR WASTEWATER FILTERS USING UNDERDRAINS

CROSS-REFERENCE TO RELATED APPLICATION

This application claims the benefit of U.S. Provisional Application No. 61/738,319 filed Dec. 17, 2012, the entire content of which is hereby incorporated by reference.

BACKGROUND OF THE INVENTION

1. Field of the Invention

The present invention relates to water or waste water filters using underdrains and, in particular, to a method of distributing gas and liquid through such underdrains.

2. Description of Related Art

Gravity filters are used to separate suspended solids from water. The main components of gravity filters are filtering media and underdrain blocks. Underdrain blocks are generally square, rectangular, or triangular in cross section and have a long longitudinal axis as compared to their cross section. They are attached end-to-end to form long sections called laterals, or are extruded to length, or are fabricated to length. Filter underdrain laterals are laid on the floor of the filter tank one next to the other in parallel rows to define gas and liquid flow conduits below a bed of filtering media. The filtering media is used to capture dirt or contaminant particles from a liquid being filtered as the liquid passes through the media. The filter media is supported by a media retainer so that it will not pass into the underdrain block or collection system.

The gas and liquid flow conduits make possible the collection of filtered liquid during filtration and the distribution of gas and liquid for backwash. Typically, a common main conduit (known as a "flume") is located immediately next to or under the filter tank to collect the filtered liquid from the underdrain laterals during filtration and to distribute gas and/or liquid to the underdrain laterals during gas (typically air) or liquid (typically water) backwash. The common main conduit also distributes gas and liquid separately to each of the underdrain laterals during backwash. Oftentimes, to prepare the granular media for water backwash, the submerged granular media is first scoured with a gas-only backwash, where gas is pumped upward through underdrain block. The gas-only backwash loosens the dirt and other impurities so that they will be more easily carried off by a subsequent liquid and/or concurrent gas and liquid backwash phase.

It is sometimes desired to scour the filter media at a lower than customary gas rate, while also being able to distribute gas at traditional rates during other steps and processes. However, lateral-style filter underdrains do not typically distribute air sufficiently evenly across the area of a filter at these low rates. A need, therefore, exists for a method of distributing gas at a low scour rate evenly and efficiently across the area of a filter system while also still being able to distribute gas at traditional rates.

SUMMARY OF THE INVENTION

In accordance with one embodiment of the present invention, a method of distributing gas and liquid through an underdrain system includes: a) positioning an underdrain system on a filter floor, the underdrain system comprising at least one underdrain block and filter media positioned on top of the underdrain block; b) distributing gas sufficiently evenly through the underdrain system at a rate of less than 2 scfm/ft$^2$ by distributing a liquid at a rate of less than 2 gpm/ft$^2$ concurrently with the gas; c) increasing the distribution rate of the liquid, or increasing the distribution rate of the liquid and the distribution rate of the gas; d) stopping the distribution of gas; e) further increasing the distribution rate of the liquid; and f) decreasing the distribution rate of the liquid. In certain embodiments, the gas can be distributed through the underdrain system at a rate of less than 1 scfm/ft$^2$ in step b), and the liquid can be distributed through the underdrain system at a rate of 0.25 to 2 gpm/ft$^2$ in step b). The distribution rate of the liquid can be increased to a rate of 4 to 8 gpm/ft$^2$ in step c), and further increased to a rate of 15 to 30 gpm/ft$^2$ in step e).

In certain embodiments, the gas and liquid are distributed through the underdrain system during a backwashing process. In such embodiments, liquid can first be filtered through the underdrain system so that impurities are trapped within the filter media. These impurities can be removed from the filter media during step e).

In accordance with another embodiment of the present invention, a method of distributing gas and liquid through an underdrain system during an upflow filtration process includes: positioning an underdrain system on a filter floor, the underdrain system comprising at least one underdrain block and filter media positioned on top of the underdrain block; and distributing gas sufficiently evenly through the underdrain system at a rate of less than 2 scfm/ft$^2$ by distributing a liquid at a rate of less than 5 gpm/ft$^2$ concurrently with the gas during a filtration production cycle.

The present invention is also directed to a filtration system for distributing liquid and gas through filter media. The filtration system includes: an underdrain block having a top wall, a bottom wall, and two side walls connecting the top wall to the bottom wall to define an underdrain block interior; a gas inlet for supplying gas under pressure to the underdrain block; and a liquid inlet for supplying liquid under pressure to the underdrain block. The filtration system is adapted to distribute gas evenly across the underdrain block at a rate of less than 2 scfm/ft$^2$ by distributing a liquid at a rate of less than 2 gpm/ft$^2$ concurrently with the gas. The filtration system is further adapted to distribute gas evenly across the underdrain block at a rate of 2 scfm/ft$^2$ or greater.

DESCRIPTION OF THE INVENTION

Figure 1:
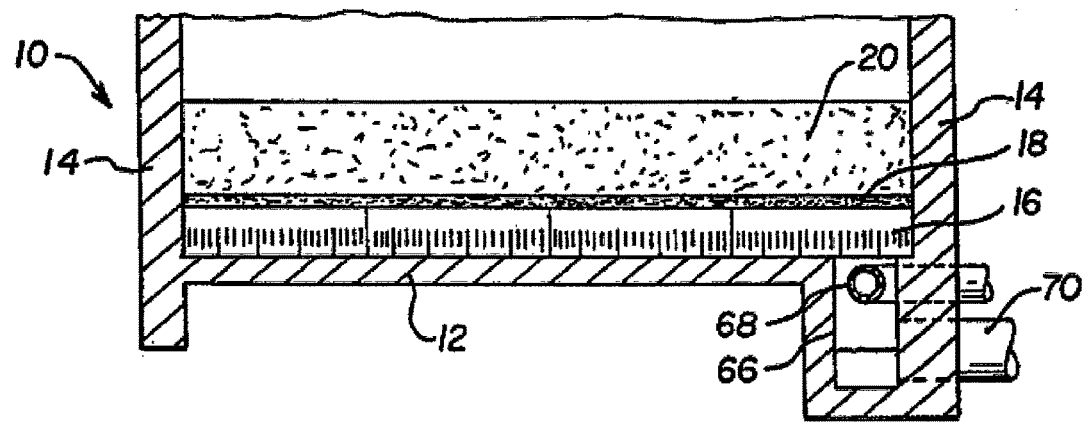
FIG. 1 is a perspective view of a filter system in accordance with one embodiment of the present invention.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 2:
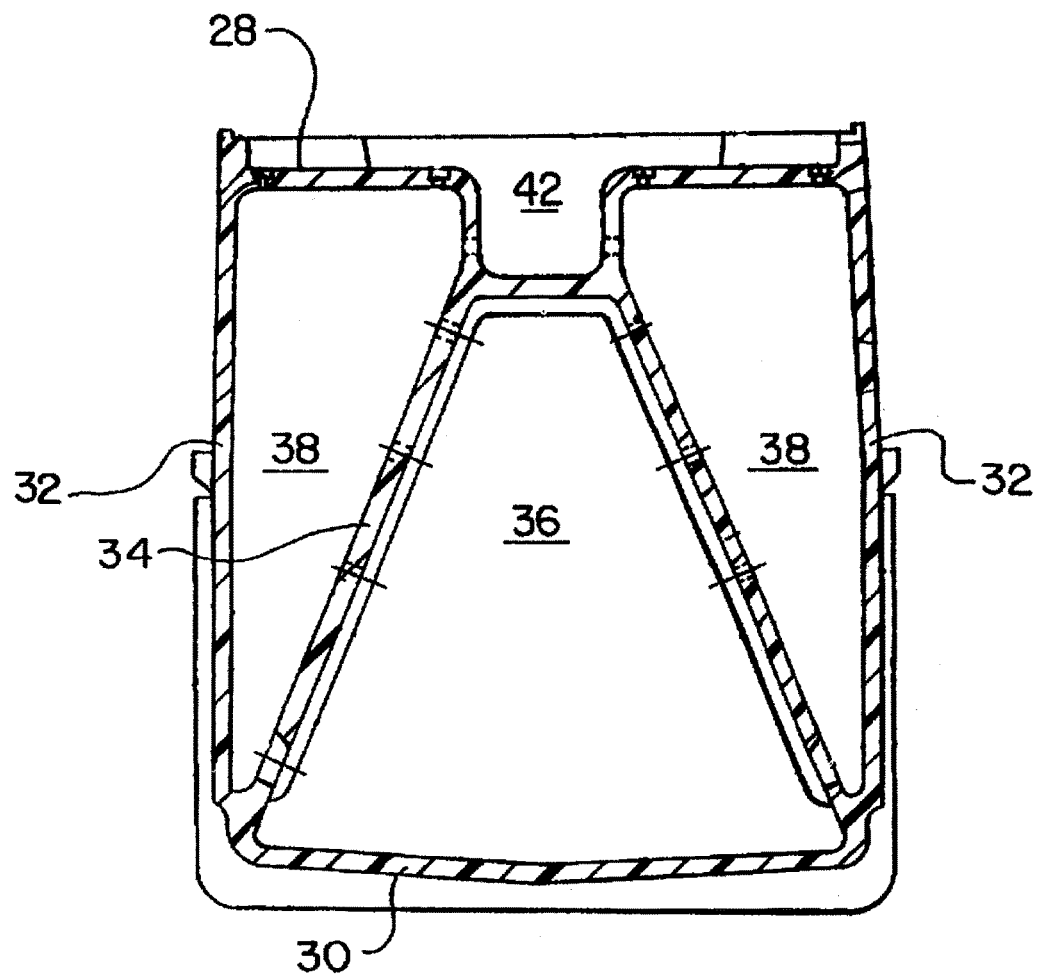
FIG. 2 is a front view of an underdrain block in accordance with one embodiment of the present invention.

Referring to FIG. 1, an example of a filter underdrain system 10 that can be used with the present invention can include a bottom wall 12 and two side walls 14. A plurality of underdrain blocks 16 can be placed end-to-end in parallel rows across bottom wall 12. The type of underdrain blocks 16 that can be used with the present invention is not limited to a particular type. In one embodiment, referring to FIG. 2, the underdrain blocks 16 each include a top wall 28, bottom wall 30, and a pair of opposed side walls 32 extending between top wall 28 and bottom wall 30. A plurality of internal walls 34 divide the hollow interior of the blocks 16 into a primary horizontal conduit 36 and two secondary horizontal conduits 38, positioned on opposed sides of the primary horizontal conduit 36. A trough 42 can be centrally located in top wall 28. Primary conduits 36 are connected to a collection flume 66, which in turn conveys the filtered liquid to a clearwell (not shown) for distribution to the consumer.

Referring again to FIG. 1, a media retainer 18 can be secured to the top of each underdrain block 16 in accordance with the present invention. A layer of filter media 20, such as sand, anthracite or granular activated carbon ("GAC") for example, is placed directly on top of the media retainer 18. The filter media 20 acts to remove and/or capture undesirable particles from the contaminated liquid flowing through filter underdrain system 10. Further details about the configuration of underdrain blocks 16 and its placement in gravity filters 10 may be found in U.S. Pat. No. 4,065,391 to Farabaugh and U.S. Pat. No. 5,639,384 to Brown et al., which are incorporated herein by reference.

To ensure maximum filter performance, the granular filter media must be washed regularly to remove the particles from the filter media 20. This is accomplished by distributing gas and liquid back through the underdrain system 10 and upward through the granular media to dislodge the foreign particles from the granular media. Referring to FIG. 1, gas can be introduced through a gas inlet 68 and liquid can be introduced through a liquid inlet 70. Typically, the filter media 20 is first scoured with a gas-only backwash before a concurrent liquid and gas backwash or a liquid-only backwash mode. The gas scour loosens the dirt and impurities within the filter media 20 for a subsequent liquid only and/or simultaneous gas/liquid backwash cycle. It is sometimes desired to use a lower-than-typical gas distribution rate during the gas scouring backwash while still being able to use traditional gas scour rates during the same or different backwashing process.

In accordance with one embodiment of the present invention, gas can be sufficiently evenly distributed through the underdrain system 10 at traditional scour rates as well as scour rates of less than 2 or 1 standard cubic feet per minute per square foot of filter area (scfm/ft$^2$). Sufficiently evenly distributed refers to the process in which all areas of the filter are cleaned during backwashing. As such, sufficiently even distribution of the gas through the underdrain system 10 means that the gas is able to be distributed to all areas of the filter. In contrast, uneven distribution would leave some areas of the filter contaminated with dirt and/or other substances and would require further cleaning of the underdrain system 10. Further, as used herein, "traditional gas scour rates" include, but are not limited to, gas scour rates of greater than 2 scfm/ft$^2$, such as from 2 to 6 scfm/ft$^2$. As such, in certain embodiments according to the present invention, filter media 20 is first scoured with gas. While gas is being pumped through the underdrain system 10 to loosen the impurities within the filter media 20 as described above, a small amount of liquid is also distributed through the underdrain system 10. By using a small amount of liquid during the initial gas scour, gas can be distributed evenly through the underdrain system 10 at a scour rate of less than 2 scfm/ft$^2$ or less than 1 scfm/ft$^2$. In some of these embodiments, gas is distributed through the underdrain system 10 at a scour rate of 0.25 to 0.75 scfm/ft$^2$. Further, while gas is being pumped through the underdrain system 10 at scour rates of less than 2 or 1 scfm/ft$^2$, the liquid can be pumped through the underdrain system 10 at a flow rate of less than 2 gallons per minute per square foot of filter media (gpm/ft$^2$). In certain embodiments, liquid is pumped through the underdrain system 10 at a flow rate of 0.5 to 2 gpm/ft$^2$. Because the liquid is supplied at a low rate, the liquid will not transport impurities out of the underdrain system 10 or blow filter media 20 out of the media retainer 18.

The initial gas scour and liquid distribution phase described above can be held for a period of time that allows the gas to agitate and break-up the impurities contained within the filter media 20 on its ascent to the surface. For instance, in certain embodiments, the concurrent gas scour and liquid backwash are pumped through the underdrain system 10 for a period of 1 to 6 minutes. However, the time period can be adjusted as understood by person(s) having ordinary skill in the art so that all the impurities trapped within the filter media 20 will become loose and capable of being transported out of the underdrain system 10 during a subsequent cycle as will be described in further detail below.

Once the impurities are agitated loose, the liquid or liquid and gas can be increased to a higher distribution rate. For instance, in one embodiment, after agitating the impurities within the filter media 20 loose, the liquid distribution rate can be increased to a flow rate of 4 to 8 gpm/ft$^2$. While the liquid is increasing, the gas is maintained at the same distribution rate. Alternatively, in some embodiments, the distribution rate of the gas can be increased to traditional gas rates such as a rate of greater than 2 scfm/ft$^2$, for example. The gas and liquid are sufficiently evenly distributed through the underdrain system 10 during this step. Thus, unlike other systems, gas can be evenly distributed through the underdrain system 10 at both traditional and lower than traditional gas distribution rates.

Figure 3:
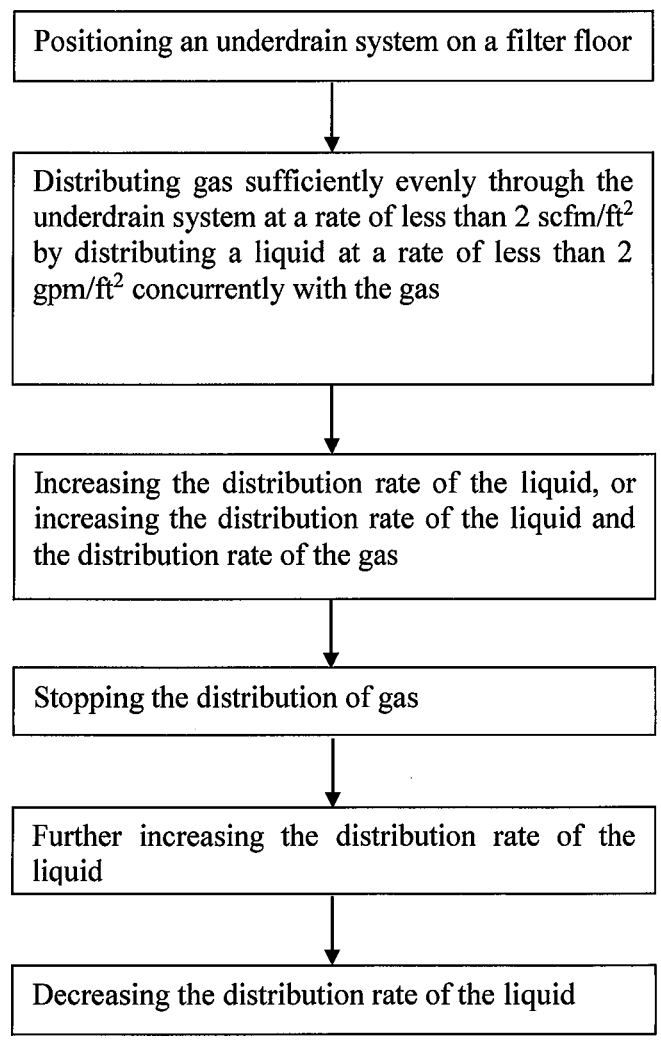
FIG. 3 is a flow chart of the general process of distributing gas and liquid through a filter system in accordance with an embodiment of the present invention.

In certain embodiments, after increasing the liquid or liquid and gas, the gas can be stopped and only liquid can be distributed through the underdrain system 10. The liquid can be distributed at a flow rate of 4 to 8 gpm/ft$^2$. The liquid flow rate can then be gradually increased even further to a rate of 15 to 30 gpm/ft$^2$. The liquid distribution rate is held at the increased flow rate for a period of time necessary to transport the impurities out of the underdrain system 10. After the impurities are transported out of the underdrain system 10, the distribution flow rate of the liquid is gradually reduced to zero and a subsequent filtration process can take place. FIG. 3 shows a flow chart of the general process of distributing gas and liquid through a filter system 10 in accordance with an embodiment of the present invention. As noted above, using a small amount of liquid during the gas-only scour cycle resulted in better air distribution during the initial backwash step when a lower-than-typical gas rate was used. Thus, the use of a small amount of liquid such as water allows the underdrain system 10 described herein to evenly distribute gas at lower-than-typical gas rates in filter underdrain systems 10 that can also evenly distribute gas at traditional gas rates.

The present method of distributing gas and liquid through an underdrain system 10 can be used with one underdrain block 16. Alternatively, the present method can also be used for distributing gas and liquid through an underdrain system 10 that contains multiple laterals formed from multiple underdrain blocks 16. The laterals can have various lengths and sizes.

Further, filter systems must be designed on the basis of a certain minimum hydraulic headloss to establish optimum backwash distribution. For fluidized media applications, such headloss must generally be greater than the clean filter media headloss at its incipient fluidization point, where full media fluidization is expected. On the other hand, the backwash headloss must not be so high as to require undue energy to achieve appropriate backwash flow. Filter systems that use the present method experience an increase in headloss as compared to current methods that use a lower-rate backwash gas with underdrain systems 10.

In addition to gravity filtration, gas can be distributed through an underdrain system 10 at a low distribution rate during an upflow filtration process. In an upflow filtration process, feed water is introduced through a flume and then up through the underdrain blocks 16. The water then exits through the top of the underdrain blocks 16 and filter media 20. In one embodiment, during the filtration production cycle of an upflow filtration process where water is filtered, gas is distributed through the underdrain system 10 at a rate of less than 2 or 1 scfm/ft$^2$, such as a rate of 0.25 to 0.75 scfm/ft$^2$, as feed water is traveling up through the underdrain system 10. In certain embodiments, during the filtration production cycle of an upflow filtration process, feed water is distributed through the underdrain system 10 at a flow rate of less than 5 gpm/ft$^2$, such as less than 4 gpm/ft$^2$. After the filtration process is completed, a backwashing method can be commenced.

While various embodiments were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A method of distributing gas and liquid through an underdrain system, the method comprising:
   a) positioning the underdrain system on a filter floor, the underdrain system comprising at least one underdrain block and filter media positioned on top of the at least one underdrain block;
   b) distributing gas sufficiently evenly through the underdrain system during the backwashing process at a rate of less than 2 scfm/ft$^2$ by distributing a liquid at a rate of less than 2 gpm/ft$^2$ concurrently with the gas through an interior of the at least one underdrain block and into the filter media of the underdrain filter system;
   c) increasing a distribution rate of the liquid after step b), or increasing the distribution rate of the liquid and a distribution rate of the gas after step b);
   d) stopping a distribution of gas;
   e) further increasing the distribution rate of the liquid after step d); and
   f) decreasing the distribution rate of the liquid after step e).

2. The method according to claim 1, wherein the gas is distributed through the underdrain system at a rate of less than 1 scfm/ft$^2$ in step b).

3. The method according to claim 1, wherein the liquid is distributed through the underdrain system at a rate of less than 1 gpm/ft$^2$ in step b).

4. The method according to claim 1, wherein the distribution rate of the liquid is increased to a rate of 4 to 8 gpm/ft$^2$ in step c).

5. The method according to claim 1, wherein the distribution of the gas is increased to a rate of 2 to 6 scfm/ft$^2$ in step c).

6. The method according to claim 1, wherein the distribution rate of the liquid is increased to a rate of 15 to 30 gpm/ft$^2$ in step e).

7. The method of claim 1, further comprising filtering liquid through the underdrain system after step a) such that impurities are trapped within the filter media.

8. The method of claim 7, wherein the impurities are removed from the filter media during step e).

9. The method of claim 1, further comprising stopping the distribution of liquid after step f).

10. The method of claim 1, wherein the underdrain system further comprises a media retainer.

11. A method of distributing gas and liquid through an underdrain system during an upflow filtration process, the method comprising:
   a) positioning an underdrain system on a filter floor, the underdrain system comprising at least one underdrain block and filter media positioned on top of the underdrain block; and
   b) distributing gas sufficiently evenly through the underdrain system at a rate of less than 2 scfm/ft$^2$ by distributing a liquid at a rate of less than 5 gpm/ft$^2$ concurrently with the gas through an interior of the at least one underdrain block and into the filter media of the underdrain filter system during a filtration production cycle.

12. The method of claim 11, wherein the gas is distributed through the underdrain system at a rate of less than 1 scfm/ft$^2$.

13. The method of claim 11, wherein the liquid is distributed through the underdrain system at a rate of less than 4 gpm/ft$^2$.

14. The method of claim 11, wherein the underdrain system is further adapted to distribute gas sufficiently evenly at a rate of 2 scfm/ft$^2$ or greater.

* * * * *